(12) United States Patent
Ratner et al.

(10) Patent No.: US 12,287,815 B2
(45) Date of Patent: Apr. 29, 2025

(54) SYSTEM AND METHOD FOR GENERATING A RESEARCH REPORTING NARRATIVE

(71) Applicant: DISCOVERY COMMUNICATIONS, LLC, Silver Spring, MD (US)

(72) Inventors: Ian Ratner, Silver Spring, MD (US); Ettie Etela, Silver Spring, MD (US)

(73) Assignee: Discovery Communications, LLC, Silver Spring, MD (US)

( * ) Notice: Subject to any disclaimer, the term of this patent is extended or adjusted under 35 U.S.C. 154(b) by 644 days.

(21) Appl. No.: 17/183,906

(22) Filed: Feb. 24, 2021

(65) Prior Publication Data
US 2022/0269705 A1 Aug. 25, 2022

(51) Int. Cl.
| | |
|---|---|
| G06F 16/332 | (2019.01) |
| G06F 16/31 | (2019.01) |
| G06F 16/3329 | (2025.01) |
| G06F 16/38 | (2019.01) |
| G06N 20/00 | (2019.01) |

(52) U.S. Cl.
CPC ........ G06F 16/3329 (2019.01); G06F 16/316 (2019.01); G06F 16/3322 (2019.01); G06F 16/38 (2019.01); G06N 20/00 (2019.01)

(58) Field of Classification Search
CPC .............. G06F 16/3329; G06F 16/316; G06F 16/3322; G06F 16/38; G06N 20/00; G06K 9/6256
See application file for complete search history.

(56) References Cited

U.S. PATENT DOCUMENTS

| | | | | |
|---|---|---|---|---|
| 5,832,504 | A * | 11/1998 | Tripathi | G06F 40/151 707/E17.005 |
| 11,086,947 | B1 * | 8/2021 | Mantzouratos | G06F 16/9535 |
| 11,238,102 | B1 * | 2/2022 | Lisuk | G06F 16/24578 |
| 2004/0172484 | A1 * | 9/2004 | Hafsteinsson | H04L 67/565 709/230 |
| 2011/0145847 | A1 * | 6/2011 | Barve | H04H 60/64 725/9 |
| 2011/0283304 | A1 * | 11/2011 | Roberts | H04H 60/46 725/40 |
| 2012/0036421 | A1 * | 2/2012 | Ahn | G06F 40/151 715/223 |
| 2012/0047251 | A1 * | 2/2012 | Baumback | G06F 11/3495 709/224 |
| 2012/0059825 | A1 * | 3/2012 | Fishman | G06F 16/4387 707/737 |
| 2013/0247081 | A1 * | 9/2013 | Vinson | H04N 21/254 725/14 |
| 2014/0109124 | A1 * | 4/2014 | Morales | H04N 21/44204 725/14 |
| 2016/0105708 | A1 * | 4/2016 | Packard | H04N 21/23418 725/10 |

(Continued)

Primary Examiner — Bhavesh M Mehta
Assistant Examiner — Philip H Lam
(74) Attorney, Agent, or Firm — Bookoff McAndrews, PLLC

(57) ABSTRACT

The invention includes systems and methods to provide a research reporting narrative, in particular, for research metrics. Specifically, the invention includes content performance metrics and contributing factors to performance, The invention collects, analyzes, and places into a narrative format, data from research that is not easily digestible. The invention provides a quick and efficient report for absorption by users.

17 Claims, 5 Drawing Sheets

(56) References Cited

U.S. PATENT DOCUMENTS

| | | | |
|---|---|---|---|
| 2017/0262925 A1* | 9/2017 | Rangasamy Kannadasan | G06F 16/248 |
| 2017/0329991 A1* | 11/2017 | Van Dyne | G06F 21/6245 |
| 2017/0371932 A1* | 12/2017 | Chamarajnagar | G06F 11/3452 |
| 2018/0091868 A1* | 3/2018 | Borok | H04N 21/2665 |
| 2018/0308001 A1* | 10/2018 | Doddala | G06N 20/00 |
| 2019/0179842 A1* | 6/2019 | Shah | G06F 16/35 |
| 2019/0385743 A1* | 12/2019 | Rasmussen | G16B 40/20 |
| 2019/0392487 A1* | 12/2019 | Duke | G06V 30/413 |
| 2020/0321133 A1* | 10/2020 | Gonzales, Jr. | G16H 10/60 |
| 2021/0057071 A1* | 2/2021 | Barber | G16H 15/00 |
| 2021/0103775 A1* | 4/2021 | Glass | G06F 40/284 |
| 2021/0110916 A1* | 4/2021 | Flevotomos | G16H 40/20 |
| 2021/0294823 A1* | 9/2021 | Lee | H04L 51/066 |
| 2021/0303319 A1* | 9/2021 | Hamze | G06F 8/20 |
| 2021/0319491 A1* | 10/2021 | Kushch | G06Q 10/06313 |
| 2022/0046301 A1* | 2/2022 | Palczewski | H04N 21/2407 |
| 2022/0050955 A1* | 2/2022 | Awadalla | G06F 40/169 |
| 2024/0054384 A1* | 2/2024 | Catron | G06F 9/5061 |

* cited by examiner

SYSTEM AND METHOD FOR GENERATING A RESEARCH REPORTING NARRATIVE

TECHNICAL FIELD

The invention relates to providing a way to aggregate performance data for digital content, as well as provide narration of those performance metrics. Traditionally, the performance data for channels/content include information comparing the digital content to other content, competition, previous performance, and other factors which may influence viewing behavior. However, such data is unwieldy and requires a manual and time-consuming analysis even as more information is added for more detail and geographic locations.

BACKGROUND

Media providers constantly search for new and better ways to evaluate performance of content for creating and delivering more attractive content to viewers. Traditional over the air broadcast television, performance metrics are established through random selection of household viewing. However, with the advent of digital and streaming content, the media market has become further fragmented, and thus performance metrics have also become more fragmented. Additional performance metrics may include much more information and be collected from every device capable of viewing digital and streaming content. Due to this expansion of performance metrics, media providers (e.g., broadcasters, TV platforms, agencies and advertisers) have more and more access to proprietary data sets and rich consumer data from other sources which has created more opportunities to establish new forms of targeting and audience buying, new trading models, and better consumer experiences.

Traditionally overnight performance reporting has been a manual, time-consuming, and labor-intensive process which requires either additional resources as new territories are added, or results in bare-bones reporting. Due to resource limitations, information in many global markets are so limited as to only have capacity to process and report on a few of those markets. Therefore, economic opportunities are lost due to inability to identify, and consequently, produce more assets in which viewers/consumers are interested. Thus, in order to remedy these deficiencies, research reporting narrative systems and methods address these shortcomings.

In some embodiments, a computer-implemented method for research reporting narration of performance metrics, the computer-implemented method comprises collecting data tables from a data source. The computer-implemented method comprises generating, using a trained model, one or more natural language narrative reports based on data in the data tables. The computer-implemented method comprises receiving a pre-defined query from a user. The computer-implemented method comprises selecting, by the trained model, one or more of the natural language narrative reports to respond to the pre-defined query by the user. The computer-implemented method comprises sending the selected natural language narrative reports to the user tor presentation.

In some embodiments, the computer-implemented method comprises identifying an audience. The computer-implemented method comprises identifying, by the trained model, relevant data from the data tables. The computer-implemented method comprises analyzing the relevant data to determine, by the trained model, contribution to the data. The computer-implemented method comprises adapting the selected natural language narrative reports based on the analysis. In some embodiments, the computer-implemented method comprises collecting additional data based on the analysis. In some embodiments, the computer-implemented method comprises standardizing the one or more natural language narrative reports. In some embodiments, the computer-implemented method comprises of the relevant data including a temporal association of the data in the data tables. In some embodiments, the computer-implemented method comprises of the relevant data including a cohort performance associated with the data in the data tables, In some embodiments, the computer-implemented method comprises of the additional data including information associated with unusual results in the data of the data tables. In some embodiments, the computer-implemented method comprises receiving an undefined query from the user; and determining associated data to the query.

In some embodiments, a computer system for research reporting narration of performance metrics, the computer system comprises a trained model processor. The trained model processor collects data tables from a data source. The trained model processor generates one or more natural language narrative reports based on data in the data tables. The trained model processor receives a pre-defined query from a user. The trained model processor selects one or more of the natural language narrative reports to respond to the pre-defined query by the user. The trained model processor sends the selected natural language narrative reports to the user for presentation.

In some embodiments, the computer system identifies an audience. The computer system identifies, by the trained model processor, relevant data from the data tables. The computer system analyzes the relevant data to determine, by the trained model processor, contribution to the data. The computer system adapts the selected natural language narrative reports based on the analysis. In some embodiments, the trained model processor of the computer system collects additional data based the analysis. In some embodiments, the computer system standardizes the one or more natural language narrative reports. In some embodiments, the computer system the relevant data includes a temporal association of the data in the data tables, In some embodiments, the computer system the relevant data includes a cohort performance associated with the data in the data tables, In some embodiments, the computer system the additional data includes information associated with unusual results in the data of the data tables. In some embodiments, the computer system receives an undefined query from the user, and determines associated data to the query,

SUMMARY

The systems and methods of the claimed invention provide narrative form reporting of performance research. Quality overnight summary reporting should include narratives describing channel performance vs. previous periods, performance vs. the competition, and provides insight into television and other external factors that are influencing viewing behavior. The rise of Artificial Intelligence (AI) and Natural Language Generation (NLG) technologies presents a new opportunity dramatically scale performance research and insight reporting capabilities as well as provide new capabilities to reach many markets in different parts of the world. New delivery mechanisms for market research can be utilized, including generation and delivery of automated text messages and asking smart devices (e.g., Amazon Echo, Google Home, iHome, etc.), "How did we do in Italy last night?"

The systems and methods of the invention incorporate augmented analytics using Artificial Intelligence (AI) and Machine Learning (ML) to automate data preparation, insight discovery, and insight sharing of performance metrics to create consistent standardized communications of media provider asset (i.e., content) performance. The augmented analytics enable analysts to focus on specialized problems and on embedding enterprise-grade models into applications. Users will spend less time exploring data and more time acting on the most relevant insights with less bias than in manual approaches.

The systems and methods of the invention specifically render narrative presentations of media performance metrics. However, narrative reporting of other analytics/research data are also contemplated as potential presentable performance metrics. The systems of the invention incorporate augmented analytics using AI and ML to provide insight discovery, and insight sharing to create consistent standardized communications of media asset performance. The augmented analytics enable analysts to focus on specialized problems with media assets and on embedding enterprise-grade models into applications. in other words, the invention provides users with time savings in exploring performance metric data and to give more time to act on the most relevant insights and with less bias than in manual approaches.

The systems of the invention generate meaningful, human readable printed or audio narratives that describe and provide insights into the viewership performance of media programming. The systems of the invention are configurable to connect to any number of external performance metric associated sources of data, such as, television ratings data (e.g., Nielsen, Kantar, GFK, and Ipsos), public holiday calendars, weather data (e.g., weather feeds and other sensors), major news events (e.g., from news sources), digital viewership data (e.g., from short form consumption metrics and non-linear content hosts such as Comcast, Time Warner, Disney, Viacom, etc.), and other data sources (e.g., any sources of data that affect viewership such as Tubular).

The systems of the invention analyze and process the data into a consumable format a commercial natural language generation (NLG) tool to produce either written or spoken narratives in any language. Once a narrative is generated, it will either be spoken via a digital assistant such as Siri, Cortana, Amazon Echo, or Google Assistant, etc., or documented in a written format. It scheduled for automated delivery, the systems produce the narrative document or email format and deliver the output to the recipients.

The systems and methods of the invention account for knowledge about the recipient as well, such as in the case of consumers or ad executives that may require different narratives than a media reviewer.

In particular, the methods of the invention describe an exemplary embodiment for research reporting narration of performance metrics by collecting data tables from a data source. The methods generate, using a trained model, one or more natural language narrative reports based on data in the data tables. The methods receive a pre-defined query from a user. The methods select, by the trained model, one or more of the natural language narrative reports to respond to the pre-defined query by the user. The methods send the selected natural language narrative reports to the user for presentation.

The methods of the invention further identify an audience. The methods identify, by the trained model, relevant data from the data tables. The methods analyze the relevant data to determine, by the trained model, contribution to the data. The methods adapt the selected natural language narrative reports based on the analysis. The methods collect additional data based on the analysis. The methods standardize the one or more natural language reports. The relevant data used by the methods include a temporal association of the data in the data tables. The relevant data used by the methods include a cohort performance associated with the data in the data tables. The additional data used by the methods include information associated with unusual results in the data of the data tables, The methods receive an undefined query from the user. The methods determine associated data to the query, The computer systems of the invention are exemplary embodiments implementing a research reporting narration of performance metrics with a trained model processor configured to collect data tables from a data source. The computer systems generate, by the trained model processor, one or more natural language narrative reports based on data in the data tables. The computer systems receive a pre-defined query from a user. The computer systems select, by the trained model processor, one or more of the natural language narrative reports to respond to the pre-defined query by the user. The computer systems send the selected natural language narrative reports to the user for presentation.

The computer systems of the invention further identify an audience. The computer systems identify, by the trained model processor, relevant data from the data tables. The computer systems analyze the relevant data to determine, by the trained model processor, contribution to the data. The computer systems adapt the selected natural language narrative reports based on the analysis. The computer systems collect additional data based on the analysis. The computer systems standardize the one or more natural language reports. The relevant data used by the computer systems include a temporal association of the data in the data tables. The relevant data used by the computer systems include a cohort performance associated with the data in the data tables. The additional data used by the computer systems include information associated with unusual results in the data of the data tables. The computer systems receive an undefined query from the user. The computer systems determine associated data to the query.

DETAILED DESCRIPTION

Figure 1:
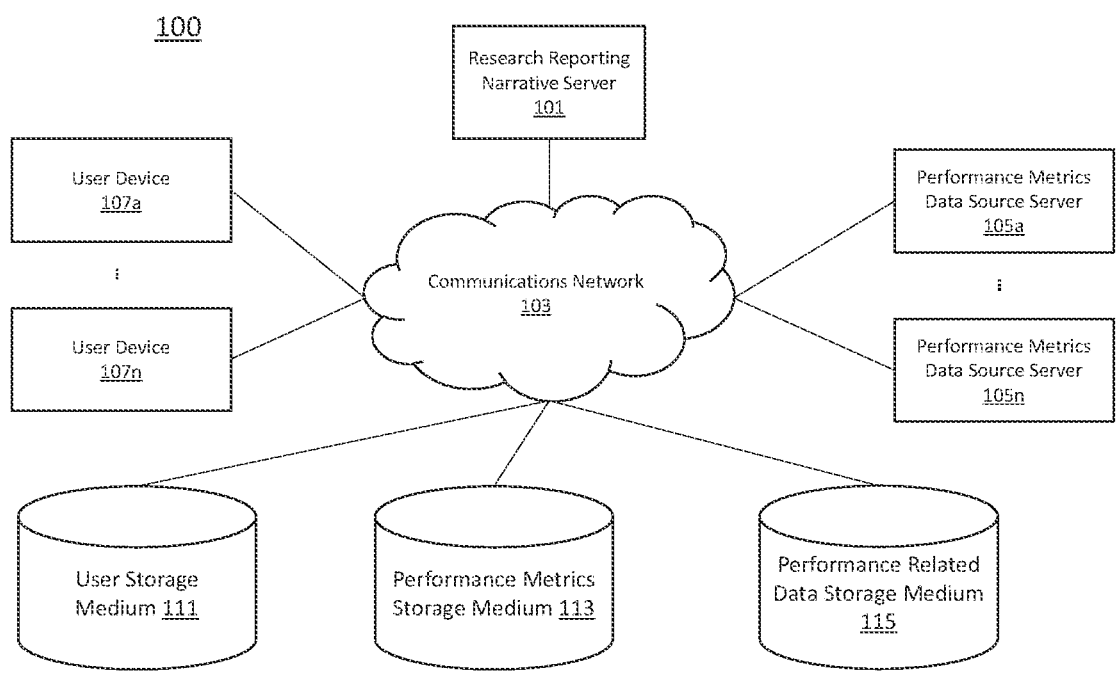
FIG. 1 illustrates a research reporting narrative system in accordance with the invention.

FIG. 1 illustrates a narrative form reporting of performance research system 100 that includes a research reporting narrative server 101, communications network 103, performance metrics data source servers 105a-105n, user devices 107a-107n, user storage medium 111, and performance metrics storage medium 113, and performance related data storage medium 115, according to one embodiment of the invention. System 100 receives performance metrics reports at the research reporting narrative server 101, which communicates with the performance metrics data source servers 105a-105n to collect, review, and transform performance metrics data.

The research reporting narrative server 101 communicates either over a communication network, e.g., LAN, Cable, WLAN, or other wired or wireless network, or through a direct communication connection, e.g., USB, to store the performance metrics data, in a standardized form, in the performance metrics storage medium 113, The server 101 may include a fully modular architecture that includes one or more distributed or centralized computing devices, e.g., servers, workstations, devices with processors and memory, processors, memory, etc. to enable a content provider to deploy the system 100. The server 101 functions include collecting performance data from data sources such as total addressable market (TAM) companies which may include digital performance metrics accommodating data streams (e.g., video on demand (VOD), return-path data (RPD), etc.); analysis and natural language (NL) reporting of requested and key aspects of the performance data.

The architecture of the narrative form reporting of performance research system 100 supports compact to large-scale deployment of the system 100 and ensures that storage and processing capabilities are robust and suitable for data capture, processing, reporting, and storage operations. In other exemplary embodiments, the server 101 may be in communication with the user storage medium 111, performance metrics storage medium 113, performance related data storage medium 115, performance metrics data source servers 105a-105n, or other servers as well. 1000261 An increasing need exists for providing a clearer and more digestible understanding of research and performance data for content providers to make better decisions with their resources over shorter time periods. The system 100 collects performance metric data from the performance metrics data source servers 105a-105n. The performance metrics data source servers 105a-105n may include television audience measurement data, news event measurement data, digital performance data, etc. The server 101 then combines and/or standardizes the data for analysis. The analysis of the data and generates pre-determined summaries of various content markets. The server 101 does this for each known market.

Next, the server 101 generates natural language reports for each market summary, along with performance summaries for specified time periods, e.g., overnight, weekly, monthly, quarterly, yearly, etc. These natural language processes identity an audience of the report, e.g., user, and important data, i.e., key metrics, associated with a report. The server 101 can also analyze the important data to determine factors which contribute or detract from the data. The server 101 may also rank performance data and determine a bench marked average for the data. The server 101 may collect data from various data sources and apply domain specific knowledge to both the collection and analysis of the aggregated data. Further, the server 101 may standardize the narration to identify data that may be communicated and adapt and deliver the narration to the user accounting for audience information.

Figure 2:
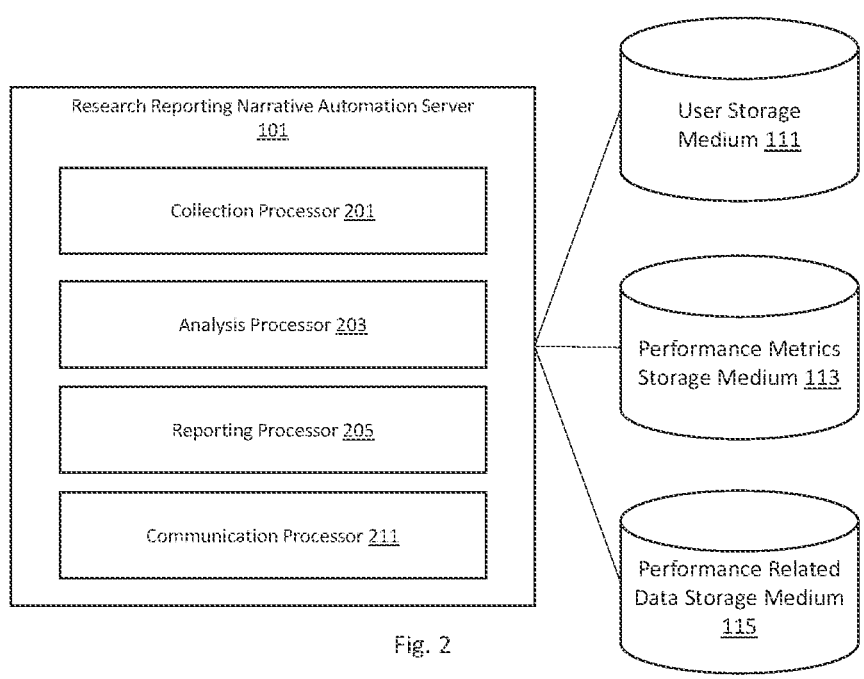
FIG. 2 shows a block diagram of components of a research reporting narrative server in accordance with the invention.

The FIGS. show an exemplary system of the invention for generating a research reporting narrative. For example, FIG. 1 shows a system 100 in accordance with the invention that collects research data and generates natural language narrative reports of the data, FIG. 2 provides a detailed breakdown of components included in the research reporting narrative server 101.

The system 100 includes the research reporting narrative server 101 that may be connected (wired or wirelessly) to a communications network 103, the communications network 103 may further be configured to communicate with performance metrics data source servers 105a-105n, user devices 107a-107n, and storage devices including at least user storage medium 111, performance metrics storage medium 113 and performance related data storage medium storage medium 115. The communications network 103 may include any number of LAN, WLAN, Wi-Fi, cellular networks (e.g., 4G LTE and 5G networks), closed circuit networks, etc. In the exemplary embodiment of the invention shown in FIG. 1, the user devices 107a-107n access the server 101 for reporting research narratives for more efficient understanding of performance. The storage mediums 111, 113, and 115 may include scalable storage mediums, databases, one or more server memory/storage, etc. as well as cloud storage devices from which the content in the storage mediums 111, 113, and 115 may be retrieved and/or stored.

The server 101 may track and analyze the data to determine outlier data. The server 101 will then further determine contributing factors to such outlying results. For example, the server 101 may determine, in the audience observation example, that program 1 rated highest this week but all the regularly scheduled competitor program in the same time slot and of similar network size were reduced from the previous week. Based on this, the server 101 may determine that a new program was showing that drew extra audience. If, however, no known events within the domain could be considered a contributing factor, then the server 101 may look to other explanations outside of the domain, e.g., it was a holiday and many potential audience members were unable to watch the regular program.

The user devices 107a-107n may send a request to the server 101 for response to a user inquiry. The user devices 107a-107n may be directed by the server 101 via the communications network 103 to store queries tor tracking and analysis. For example, based on the previous determination of contributing factors, the contributing factor is stored with the audience observations tor that day/time and domain. The user devices 107a-107n may include with the request, any knowledge of the user which may affect the domain.

As shown in further detail in server 101 of FIG. 2, the research reporting narrative server 101 may include many component modules, processors, services, and applications to accomplish the visual validation of the transformed content. Although FIG. 2 shows the server 101 as a single device, the server may include any number of processing devices that include various modules from server 101. Each module may include either a software or hardware solution, such as a computer processor, that meets the needs of the system 100. The server 1.01. may include a collection processor 201, analysis processor 203, reporting processor 205, and communications processor 211. The server 101 may be configured to retrieve and store content with the storage device mediums 111-115 including the user storage medium 111, performance metrics storage medium 113, and performance related data storage medium 115.

The collection processor 201. is used with the communications processor 21.1 to receive research data from any number of performance metrics data source servers 105a-

105n. The collection processor 201. uses one or more ratings/viewership data providers (e.g., Nielsen, Kantar, GFK, Ipsos, Comcast, Time Warner, Disney, Viacom, Tubular, etc.) to coiled data on user associated content. In particular, for example, for broadcast and cable television ratings—Nielsen, Kantar, GFK, Ipsos, etc. For digital content viewership, service providers such as Comcast, Time Warner, Verizon, Disney, Viacom, etc. may provide similar data. Further, other sources may include data to be collected, such as governmental organization (e.g., the office of personnel management), weather services (e.g., The Weather Channel), and major news outlets (e.g., Thompson Reuters). To accommodate the various data sources, the collection processor 201 may also standardize and/or harmonize data.

For example, ratings/viewership data may be collected, for content in both the digital and traditional cable television domains from both Nielsen and Time Warner. The collection processor 201 may request this data any time on a regular basis, however, the collection processor 201 may also track the collected data to verify that the data was not previously collected. This data is placed into reporting data tables to be analyzed by the analysis processor 203. Additionally, should the analysis processor 203 need more data, the collection processor 201 may be requested to collect more from other sources.

The analysis processor 203 may be used with the collection processor 201 to access and process the collected data and/or directly access the storage mediums 111-115 to analyze the data. The analysis processor 203 may utilize any number of machine learning and/or artificial intelligence architectures to analyze the collected data and determine first, a goal of a report which includes identifying the user audience and identifying the key research metrics to report. In other words, the identified goal of the report is based on user audience domain and/or analyzing of the user request resulting in a query domain by the analysis processor 203. The analysis processor 203 is used with the communications processor 213 to receive queries from a user at a user device 107a-107n. The analysis processor 203 may then analyze collected data to determine contributors and detractors to performance of the identified goal. The analysis processor 203 may transition between research domains based on analysis of the data in a current research domain. In other words, the analysis processor 203 transitions to another domain when a change in the data occurs without an explanation in the current research domain.

For example, a user queries performance information for the previous night for content items (e.g., television programs, movies, etc.). In such an example, the analysis processor 203 first determines the user querying the system is a television network (i.e., media service provider). The analysis processor 203 may then analyze the query to identify important data and key metrics within a first identified domain of the query. Such as, when the content item is the network television's programming from the previous night, the analysis processor 203 determines the key metrics should be taken from the network television programming domain. The analysis processor 203 may determine, based on historical information, whether the performance metrics indicate a suddenly change. In other words, when the television programs from the previous night had the same performance or within a range of the same performance metrics, the analysis processor 203 provides the reporting processor 205 information that the metrics have not changed. However, when the television programs during the same timeslot, describe a drop in performance against either data from the previous week or previous day dependent upon the programming schedule, the analysis processor 203 may determine whether other networks have changed their media content. If no change, and the other media content also include a drop in performance, then the analysis processor 203 may collect data from other knowledge domains, such as a calendar domain, which may provide an explanation for such a drop. For example, Halloween occurred on the same night as the drop in performance. However, the analysis processor 203 may begin with changing to the nearest knowledge domains. In some embodiments, after the nearest knowledge domains the analysis processor 203 may select other related but non-near knowledge domains such as national network television domain to regional or local event domains in aggregate to determine whether a plurality of local events is contributing to performance changes. Further, in this example, a network television media domain to another media delivery domain, for example, from network television to streaming media service domains and/or cable television domains to determine whether any data contributes or detracts from the change in performance. Once those nearest domains have been checked in relation to the other analyzed knowledge domains, the analysis processor 203 may choose to move to further knowledge domains such as the aforementioned calendar domain or other media types such as news or print media domains.

The analysis processor 203 may use pre-set phrases to determine a goal to report. The analysis processor 203 determines drivers (e.g., contributors and detractors) associated with the goal and where to find collected data to identify performance contributors and detractors based on a time-series analysis. For example, with regard to the above query of a network television's programming performance from the previous night, the analysis processor 203 may, based on the query, identify that any television performance data is needed, including streaming and cable provider performance information. Further, the analysis processor 203 may identify special events such as movie, streaming, and/or live, in-person, events which may contribute or detract from the performance of programming associated with the network television provider. Thus, the analysis processor 203 may use the collection processor 201 to aggregate data from all known regional, local, and national network television, streaming media, movie, calendar and/or news domains. Once, the primary identified knowledge domain data is aggregated, any discrepancy or inability to find a driver may result in expanding the domains from which the data is collected. in other words, the knowledge domains may be expanded to written media domains such as magazines, newspapers, blogs, etc.

The analysis processor 203 also may rank cohorts of data against one another and against benchmarks to determine drivers. For example, television programming associated with food during the same timeslot and/or on a streaming platform may be compared to generate a benchmark to determine whether a network television's programming associated with food is doing well. In other instances, new network television's programming is compared against other historical or current new television programming regardless of content to determine whether the new programming is doing well historically.

Further, the analysis processor 203 may apply domain knowledge to adjust and aggregate the collected data. For example, the domain knowledge may include locality (e.g., regional or national types of media (e.g., print, internet, audio, movies, television, streamed, etc.), genre (e.g., music genres include country, rap, pop, etc.; movie/television streaming media genres include documentaries, dramas, family, action, etc.; and internet and print media include categories such as news, foreign policy, opinion, areas of interest (e.g., automobiles, woodworking, hairstyling, cosmetics, do-it-yourself, etc.), etc. Further, domain knowledge may include knowledge regarding specific content media data, such as metadata including plot information, timestamped storylines, artists, directors, etc.

The reporting processor 205 receives the collected data from the analysis processor 203. The reporting processor 205 is used with the communication processor 211 to send and thereby present the results to the user. The reporting processor 205 identifies data that can be expressed linguistically and adjusts a selected narrative report for presentation of the identified data.

Figure 3:
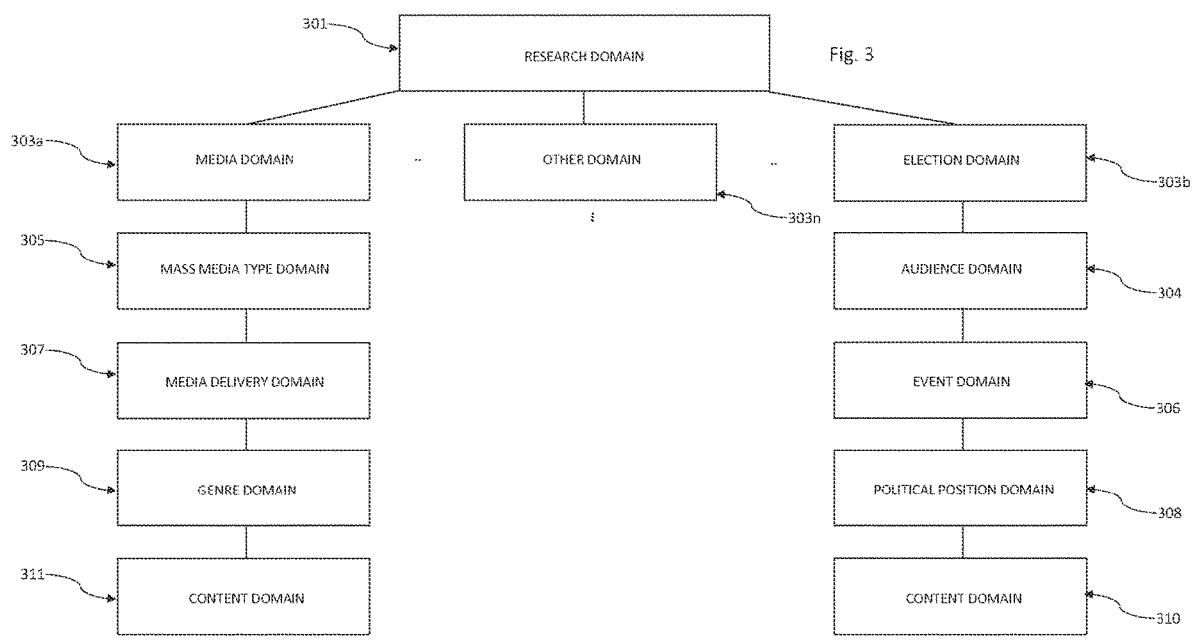
FIG. 3 shows a diagram of content domains by the research reporting narrative server in accordance with the invention.

FIG. 3 shows a diagram of a domain hierarchy from which the analysis processor 203 may be provided a basis of knowledge. The research domain 301 separates into various domains 303a-303n, including in particular, the media domain 303a. Each of the other domains 303n may include areas such as the medical domain, building domain, calendar domain, events domain, weather domain, etc, The domains 303a-311 describe a hierarchy of domains within the media domain 303a. In particular, the media domain 303a steps from general media data to mass media type domain 305 including print, internet application (e.g., social media, blogs, applications, etc.), audio (e.g., music, podcasts, etc.) visual (e.g., movies, television, images, etc.). Each mass media type domain 305 may further be separated into media delivery domains 307 including locality (e.g., local, regional, national, world-wide, etc.), network, cable, streaming media services, etc. Further, each media delivery domain 307 may be separated into genre domains 309 such as movies/television genres include documentaries, horror, family, animated, drama, westerns, sports, comedies, etc. each of which may be further separated into more specific genres, such as, in comedies, specific genres include romantic comedies, stand up, dark comedy, improvisational, sitcoms, etc. Last, each content item may include its own content domain 311 associated with a timeline of data for each content item. For example, a movie or television program may include a storyline/plot. The story may vary over time resulting in changes to viewership. Such changes, may be identified and tracked to identify detailed performance changes over smaller and smaller time periods to provide media executives a best understanding of why one or more programs failed or excelled.

Thus, for example, a media executive may query for how the media provider did the previous night. The system 100 may coiled performance metrics from traditional and digital metrics sources. Assuming, no new or special programming, the system 100 may compare performance against past metrics, comparing similar showing times/dates to previous weeks, to determine whether any change in performance has occurred. If a change has occurred, the system 100 may determine, by traversing research domains to determine contribution to the change, For instance, one of the programs presented on network television has a particularly divisive storyline. The system 100 would determine from the content domain 311 performance metrics that such a storyline resulted in lower viewership and thus the media executive would be notified of such a performance change and alleged reason for the performance drop. For example, a smart device would notification the media executive that "performance last night remained within the same levels, except during the network television program at 9 PM which had a storyline that was disliked by many viewers." If other changes also occurred, the system 100 may notify of additional contributors to those changes. In instances where the notifications occur for longer than a period of time, the system 100 may let the user know that a written presentation may be more applicable and is sent through email or other textual messaging method.

Another example of a research domain 301 may include an election domain 303b related to polling data, The election domain 303b may include different races (e.g., president, senator, congressperson, governor, state senator, sheriff, board of education, etc.) in different municipalities (e.g., country, state, county, city, etc.) and one or more candidates for each race and polling information for each candidate. Based on the election domain 303b, an audience domain 304 may be selected. The audience domain 304 may include various conglomerates within the municipalities, such as, based on physical region or audience make up (e.g., ethnic background, age range, profession, organizational membership, etc.) and polling data for the audience. Further to the audience domain 304, an event domain 306 for the particular audience may be determined. Such events may include speeches, memorials, virtual events, town hall discussions, etc. and effects on polling data. Further, each event may provide a particular political position domain 308 which describe the position taken by a candidate and positional effects on polling data. Additionally, each position may be broken into parts of a speech in a content domain 310. Each section of the speech, such as, introduction, substantive portion(s), and conclusion may include polling data for each section which can be collected.

For example, a campaign manager may ask for how their candidate did in the polls from the previous night. The system 100 may collect polling data from polling sources. The system 100 may compare performance against past polling data, comparing similar meeting types (speeches, volunteering, etc.) and locality of the meeting, audience size, and influence, to determine whether any change in performance has occurred. If a change has occurred, the system 100 may determine what contributed to the change. For instance, a speech on gun control that occurs soon after local or national gun violence situations will have a different polling data than if or when such a speech occurs for regularly scheduled event(s). Thus, the campaign manager would be notified of such a polling change and alleged reason for a polling change. For example, a smart device would notify the campaign manager that "the speech last night resulted in worse polling results within a more conservative region of the state due to the recent news of gun violence."

Figure 4:
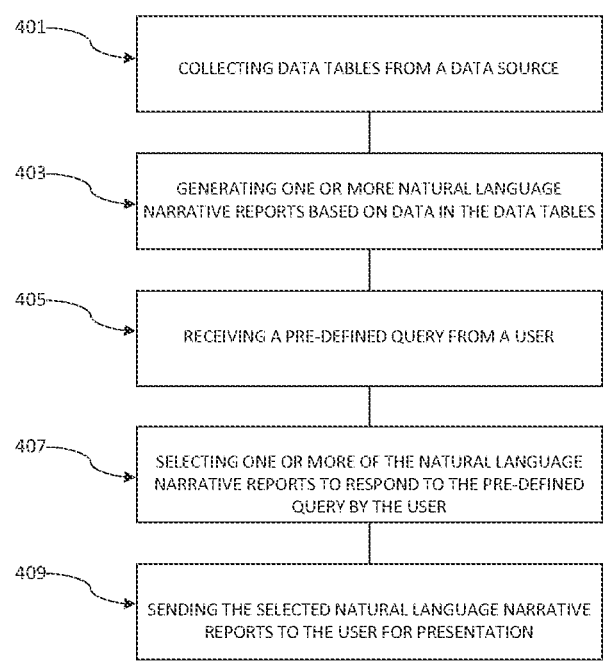
FIG. 4 shows a flow chart for a method of use of the research reporting narrative server in accordance with the invention.

FIG. 4 shows a flow chart for a method of use of the research reporting narrative system 100 to collect, review, transform, and present performance metrics data in accordance with the invention. In step 401, the server 101 collects data tables from a data source. In some embodiments, the server 101 may collect data sources, both digital and traditional, for performance metrics. The data may be automatically collected from data sources based on either, updates in the data tables of the data source or a regularly scheduled time. Data may also be collected for related traversed data domains such as proprietary information regarding the programming itself including the genre, storyline, media delivery type, cost, etc. Further, the collected data may be standardized to match performance metrics between various data sources, Such as, some digital performance metrics may include every start, every view for five minutes, viewership at various or regular intervals, and every full viewing, however others may include every start, every full viewing, viewership at various or regular intervals, and every view for ten minutes, The server 101 may determine a variance based on this difference to standardize the length of viewing to live minutes, with a wider variance in performance when at a ten-minute interval.

In step 403, the server 101, generates one or more natural language narrative reports based on data in the data tables. The server 101, based on a trained model, may generate some narrative reports based on the data in the data tables. For example, a change occurs in performance for the 5 PM time slot, the generated narrative may include "a change in performance occurred for the program during the 5 PM timeslot, however, the system has not determined what contributed to this change." The trained model may associate performance data for networks, time slots, etc. to content information from the same or other research domains. The trained model may also use AI modelling of particular performance metrics to determine the performance metrics relate to content performance or network performance over a time period or during/over the content playback.

In step 405, the server 101 receives a pre-defined query from a user. The user may query a smart device for: the latest performance of particular content; performance of a network channel or a media provider over a specified time period; or performance of digital vs traditional content by a media provider over a specified time period.

In step 407, the server 101 selects one or more of the natural language narrative reports to respond to the pre-defined query by the user, In step 409, the server 101 sends the selected natural language narrative reports to the user. The server 101 may determine the time period and channel, program, mass media type, etc. to select a matching or closest match report. For example, the data tables may lack performance metrics for digital showings of a series, thus, the server 101 may provide a performance report related to the digital showings of series in the same genre. The selected report may be sent to the device queried by the user or other device(s) related to the user based on both the selected report type, as well as any additional report(s) which may be simultaneously sent.

Figure 5:
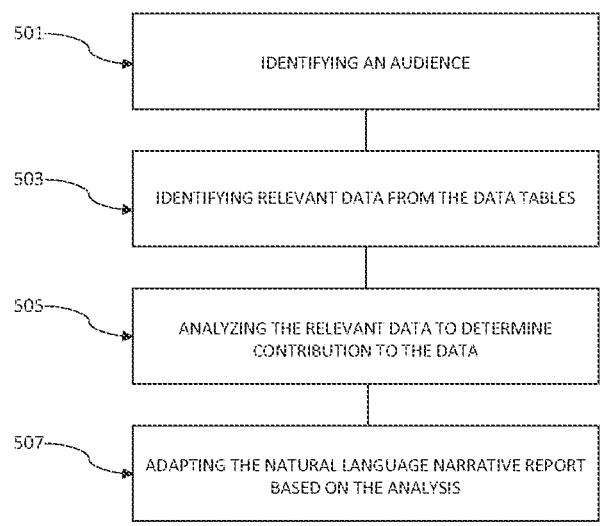
FIG. 5 shows a flow chart for another method of use of the research reporting narrative server in accordance with the invention.

FIG. 5 shows a flow chart for a method of use of the research reporting narrative system 100 to provide a tailored narrative presentation to a user in accordance with the invention. In step 501, the server 101 identifies an audience. For example, the server 101 may query for user information from user storage medium 111 to determine devices related to a user, as well as, other user detail including a user's position in the media provider organization; user duties; employment organization; etc, In step 503, the server 101 identifies relevant data from the data tables. For example, based on the user duties—for a marketing executive of digital media (as opposed to traditional media executive), only digital content performance metrics will be selected unless otherwise specified within the query. The marketing executive may also receive performance metrics for competitors as well as their own organization's media content. Other executives may receive only their own organization's media content performance metrics, In step 505, the server 101 analyzes the relevant data to determine contribution to the data. The server 101 may use trained models of contributive data to determine contribution to changes in performance. For example, an AI modelling of the performance data and changes may include historical performance which associates news worthy events, popular sporting events (e.g., the Super Bowl or other championship), etc. to drops in viewership. Other events may include competitor premieres of media content resulting in drops in viewership. Further, for example, for new content, the performance metrics of content of a similar genre and delivery method may be juxtaposed to determine whether performance is on par with new content from competitors or the media provider's own content.

In step 507, the server 101 adapts the selected natural language narrative reports based on the analysis. Based on the audience information which potentially results in different analyzed data, the report(s) may be adjusted. For example, if the user is again a marketing executive, the narrative report may also include competitor reports. Such as, the report may state "last night, there was little to no change in our performance, retaining a strong showing during prime time and weaker performance at other times, however, a competitor lost ten percent of viewership due to recent boycotting of the competitor based on a political stance taken by its founder."

The systems and methods of the invention provide research reporting narratives. The systems process research metrics from data sources to present the research metrics in a narrative form for an identified audience. Specifically, for performance of media content over a period of time, the systems provide an easily digestible narrative report of the performance metrics of the media content.

The claimed invention is:

1. A computer-implemented method, comprising:
receiving, by one or more processors, performance metric data from one or more server systems, wherein the one or more server systems are configured to utilize one or more data providers to collect the performance metric data corresponding to user associated content;
generating, by the one or more processors, via one or more trained machine-learning models, natural language data based on the performance metric data;
receiving, by the one or more processors, user query data from a user device corresponding to a user, wherein the user query data includes a user domain and a time range;
analyzing, by the one or more processors, the user query data to determine at least one key metric;
utilizing, by the one or more processors, via the one or more trained machine-learning models, the performance metric data to determine at least one driver associated with the at least one key metric;
selecting, by the one or more processors, via the one or more trained machine-learning models, a natural language data subset based on the at least one key metric, wherein the natural language data subset includes non-standardized data based on one or more collection processes of the one or more data providers corresponding to the at least one driver;
receiving, by the one or more processors, additional metric data from one or more domains based on the user domain and the time range;
aggregating, by the one or more processors, the additional metric data by applying domain knowledge from the one or more domains to the additional metric data;
analyzing, by the one or more processors, via the one or more trained machine-learning models, the performance metric data and the aggregated additional metric data to determine at least one metric update;
creating, by the one or more processors, via the one or more trained machine-learning models, contextual data corresponding to the at least one metric update;
converting, by the one or more processors, the natural language data subset to a standardized natural language data subset for updating based on the contextual data, wherein the natural language data subset is converted to a standardized format based on audience data associated with the user query data;

updating, by the one or more processors, the standardized natural language data subset based on the contextual data corresponding to the at least one metric update; and transmitting, by the one or more processors, the updated standardized natural language data subset to the user device.

2. The computer-implemented method of claim 1, wherein determining the at least one metric update includes:

ranking, by the one or more processors, the performance metric data; and determining, by the one or more processors, a benchmark average for the ranked performance metric data.

3. The computer-implemented method of claim 1, wherein the at least one key metric includes a time range specified in the user query data.

4. The computer-implemented method of claim 1, wherein receiving the additional metric data from the one or more domains includes:

determining, by the one or more processors, a temporal association of the additional metric data to the performance metric data.

5. The computer-implemented method of claim 1, wherein the domain knowledge includes a locality, a media type, a genre, and/or specific content media data.

6. The computer-implemented method of claim 1, wherein the user corresponds to a media service provider and the performance metric data corresponds to a viewable entertainment program.

7. The computer-implemented method of claim 1, wherein the at least one metric update is determined based on a performance metric for a preceding time period to the time range.

8. A computer system, comprising:

at least one memory storing processor-readable instructions;

one or more processors configured to access the at least one memory and execute the processor-readable instructions to perform operations, the operations comprising:

receiving performance metric data from one or more server systems, wherein the one or more server systems are configured to utilize one or more data providers to collect the performance metric data corresponding to user associated content;

generating, via one or more trained machine-learning models, natural language data based on the performance metric data;

receiving, by the one or more processors, user query data from a user device corresponding to a user, wherein the user query data includes a user domain and a time range;

analyzing, by the one or more processors, the user query data to determine at least one key metric;

utilizing, by the one or more processors, via the one or more trained machine-learning models, the performance metric data to determine at least one driver associated with the at least one key metric;

selecting, by the one or more processors, via the one or more trained machine-learning models, a natural language data subset based on the at least one key metric, wherein the natural language data subset includes non-standardized data based on one or more collection processes of the one or more data providers corresponding to the at least one driver;

receiving, by the one or more processors, additional metric data from one or more domains based on the user domain and the time range;

aggregating, by the one or more processors, the additional metric data by applying domain knowledge from the one or more domains to the additional metric data;

analyzing, by the one or more processors, via the one or more trained machine-learning models, the performance metric data and the aggregated additional metric data to determine at least one metric update;

creating, by the one or more processors, via the one or more trained machine-learning models, contextual data corresponding to the at least one metric update;

converting, by the one or more processors, the natural language data subset to a standardized natural language data subset for updating based on the contextual data, wherein the natural language data subset is converted to a standardized format based on audience data associated with the user query data;

updating, by the one or more processors, the standardized natural language data subset based on the contextual data corresponding to the at least one metric update; and transmitting, by the one or more processors, the updated standardized natural language data subset to the user device.

9. The computer system of claim 8, wherein determining the at least one metric update includes:

ranking the performance metric data; and determining a benchmark average for the ranked performance metric data.

10. The computer system of claim 9, wherein the at least one key metric includes a time range specified in the user query data.

11. The computer system of claim 8, wherein receiving the additional metric data from the one or more domains includes:

determining a temporal association of the additional metric data to the performance metric data.

12. The computer system of claim 8, wherein the domain knowledge includes a locality, a media type, a genre, and/or specific content media data.

13. The computer system of claim 8, wherein the at least one metric update is determined based on a performance metric for a preceding time period to the time range.

14. The computer-implemented method of claim 1, the method further comprising:

notifying, by the one or more processors, the user device of the at least one driver.

15. The computer system of claim 8, the operations further comprising:

notifying the user device of the at least one driver.

16. A non-transitory computer-readable medium storing instructions executable by one or more computer processors of a computer system, the instructions when executed by the one or more computer processors cause the one or more computer processors to perform operations comprising:

receiving performance metric data from one or more server systems, wherein the one or more server systems are configured to utilize one or more data providers to collect the performance metric data corresponding to user associated content;

generating, via one or more trained machine-learning models, natural language data based on the performance metric data;

receiving, by the one or more processors, user query data from a user device corresponding to a user, wherein the user query data includes a user domain and a time range;

analyzing, by the one or more processors, the user query data to determine at least one key metric;

utilizing, by the one or more processors, via the one or more trained machine-learning models, the performance metric data to determine at least one driver associated with the at least one key metric;

selecting, by the one or more processors, via the one or more trained machine-learning models, a natural language data subset based on the at least one key metric, wherein the natural language data subset includes non-standardized data based on one or more collection processes of the one or more data providers corresponding to the at least one driver;

receiving, by the one or more processors, additional metric data from one or more domains based on the user domain and the time range;

aggregating, by the one or more processors, the additional metric data by applying domain knowledge from the one or more domains to the additional metric data;

analyzing, by the one or more processors, via the one or more trained machine-learning models, the performance metric data and the aggregated additional metric data to determine at least one metric update;

creating, by the one or more processors, via the one or more trained machine-learning models, contextual data corresponding to the at least one metric update;

converting, by the one or more processors, the natural language data subset to a standardized natural language data subset for updating based on the contextual data wherein the natural language data subset is converted to a standardized format based on audience data associated with the user query data;

updating, by the one or more processors, the standardized natural language data subset based on the contextual data corresponding to the at least one metric update; and transmitting, by the one or more processors, the updated standardized natural language data subset to the user device.

17. The non-transitory computer-readable medium of claim 16, the operations further comprising:

notifying the user device of the at least one driver.

\* \* \* \* \*

UNITED STATES PATENT AND TRADEMARK OFFICE
CERTIFICATE OF CORRECTION

| | | |
|---|---|---|
| PATENT NO. | : 12,287,815 B2 | Page 1 of 1 |
| APPLICATION NO. | : 17/183906 | |
| DATED | : April 29, 2025 | |
| INVENTOR(S) | : Ian Ratner and Ettie Etela | |

It is certified that error appears in the above-identified patent and that said Letters Patent is hereby corrected as shown below:

In the Specification

In Column 2, Line 4, delete "performance," and insert --performance.--

In the Claims

Column 16, Line 10, Claim 16, after "contextual data" insert --,--

Signed and Sealed this
Third Day of June, 2025

Coke Morgan Stewart
*Acting Director of the United States Patent and Trademark Office*